(12) United States Patent
Burwell et al.

(10) Patent No.: US 6,167,608 B1
(45) Date of Patent: *Jan. 2, 2001

(54) TANK UPGRADING METHOD AND TANK ASSEMBLY

(75) Inventors: John R. Burwell, Eagan, MN (US);
Robin L. Berg, Sr., Hudson, WI (US);
John M. Clark, Conroe, TX (US)

(73) Assignee: Xerxes Corporation, Minneapolis, MN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/927,670

(22) Filed: Sep. 10, 1997

(51) Int. Cl.[7] ................................................... B23P 11/02
(52) U.S. Cl. .................. 29/450; 29/402.09; 220/4.12; 220/23.9; 220/567.1; 220/654
(58) Field of Search .................. 29/423, 450, 460, 29/402.09; 220/567.2, 567.1, 4.12, 23.9, 62.17, 654

(56) References Cited

U.S. PATENT DOCUMENTS

| | | | | |
|---|---|---|---|---|
| 2,186,185 | * | 1/1940 | Walker | 29/402.16 |
| 3,167,209 | * | 1/1965 | Jones | 220/63 |
| 4,347,018 | * | 8/1982 | Wrightson et al. | 29/460 |
| 4,660,738 | * | 4/1987 | Ives | 220/414 |
| 5,167,142 | * | 12/1992 | Sharp | 220/4.12 |
| 5,186,215 | * | 2/1993 | Gilleland | 29/402.09 |
| 5,320,247 | * | 6/1994 | Sharp | 29/402.09 |
| 5,405,036 | * | 4/1995 | Haase | 220/4.13 |
| 5,816,424 | * | 10/1998 | Cannan, Jr. et al. | 220/23.9 |

* cited by examiner

*Primary Examiner*—S. Thomas Hughes
*Assistant Examiner*—Jermie E. Cozart
(74) *Attorney, Agent, or Firm*—Piper, Marbury, Rudnick & Wolfe, LLP; Steven B. Kelber

(57) ABSTRACT

The present invention relates to a method of upgrading a tank or a method which involves the assembly of an inner tank within an existing outer tank. In the method of the present invention, rolled panel sections are inserted through a hole of an existing outer tank. The rolled panel sections are adjacently positioned within the existing outer tank and expanded so as to conform to the shape of the existing outer tank. End cap sections either flat or domed depending on the shape of the outer tank are also installed through the hole. All of the seams (axial and transverse) are sealed so as to provide for an inner tank within the outer tank that can rate as a stand-alone tank. Circumferential ribs are installed and attached along a length of the inner tank so as to provide for a structural rigidity of the inner tank. With the method of the present invention it is not necessary to completely replace an existing tank and at the same time, if the outer tank has structural weaknesses, the tank can be strengthened by the formation of the inner tank utilizing the method of the present invention.

27 Claims, 6 Drawing Sheets

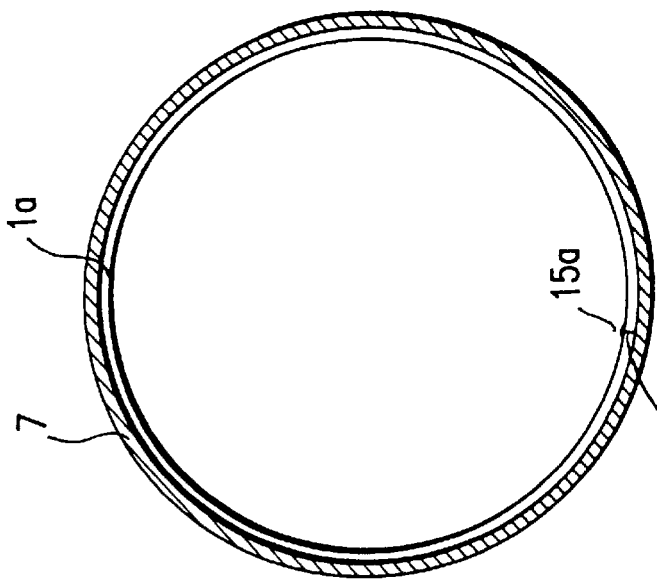
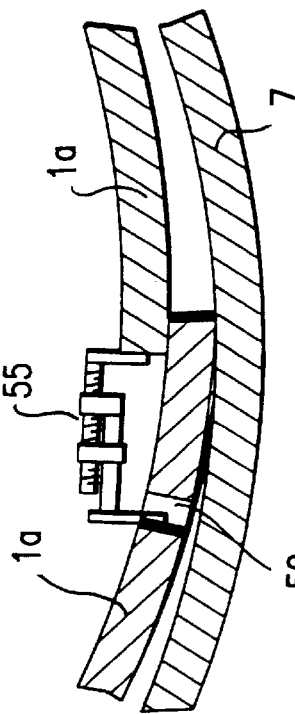
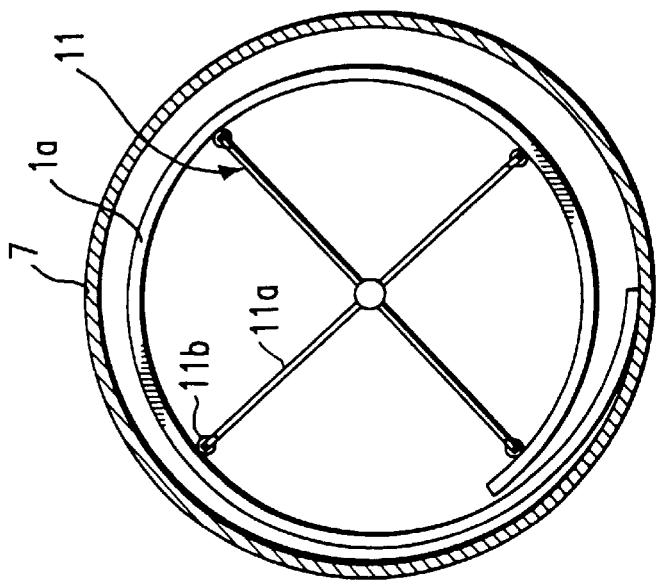

TANK UPGRADING METHOD AND TANK ASSEMBLY

BACKGROUND OF THE INVENTION

1. Field of the Invention

The present invention relates to the upgrading of an existing tank system. More specifically, the present invention relates to a method of assembling a tank within an existing tank so as to upgrade the existing tank system.

2. Discussion of the Background

In the field of upgrading existing tanks, it is usually necessary to either provide a sprayed on liner to the interior surface of existing tanks which are failing or leaking, or completely replace the existing tank. In applying a liner, the structure of the existing tank is not strengthened. Additionally, if the existing tank has buckled or has inversions, the application of a liner would only be a temporary repair and in most cases does not work. If the existing tank is to be completely replaced, this would result in disruption of the in situ soil condition and increased cost and time. In many instances, the replacement of an existing tank may make it necessary to close or disrupt the operation of an existing service station or facility for a long period of time (4–8 weeks).

SUMMARY OF THE INVENTION

The present invention provides for a tank upgrading method which not only takes a minimum amount of time, but also strengthens the rigidity of the existing tank. The present invention also relates to a tank assembly of increased strength which includes inner and outer tanks. The method of the present invention involves the insertion of panel sections into the existing tank through a hole in the existing tank, and the expansion and sealing of the panel sections so as to account for the shape of the existing tank. The inserted panel sections are thereby assembled to form a new inner tank within the existing tank.

With the method of the present invention it is not necessary to replace the existing tank. Also, the new inner tank provides for a rigidity of the existing tank which is not possible utilizing only liners.

In the method of the present invention, when the rolled panel sections are inserted into the existing tank, they are sealed together and thus are assembled into a new inner tank which can be rated as a UL (Underwriters Laboratories) approved stand-alone tank. The method of the present invention can be applied to both single wall and double wall tanks based on the condition of the existing tank to be upgraded, both steel and fiberglass as well as hybrid steel/fiberglass tanks. The method can be further applied to tanks which are above or below ground.

The present invention therefore provides for a method of assembling a tank within an existing tank which comprises the steps making a panel on a cylindircal or flat mold, of rolling a panel section on an appropriate shaft or device so as to provide for a rolled or coiled panel section; applying at least one band circumferentially around the rolled panel section so as to provide for a securely banded rolled or coiled panel section; placing the banded rolled panel section within an existing tank; cutting the band or bands around the banded rolled or coiled panel section so as to permit an initial expansion of the rolled panel section; and further expanding the initially expanded rolled panel section to provide for an expanded rolled panel section which conforms to an inner circumference of the existing tank which generally conforms to the existing tank wall in intimate contact.

The present invention also provides for a method of assembling a second tank in a first tank thereby creating a double walled upgrade if desired, comprising the steps of cutting at least one hole in the first tank; rolling a first panel section; inserting the rolled first panel section in the first tank through the at least one hole; unrolling the rolled first panel section in the first tank; expanding the unrolled first panel section so as to conform to an inner circumference of the first tank; repeating the above steps for further panel sections and placing the panel sections adjacently or with gaps of any width therebetween along a length of the first tank; and sealing an axial seam of the panel sections and transverse seams between adjacent panel sections so as to assemble the second tank within the first tank.

The present invention also provides for a tank assembly which comprises an outer tank having closed ends and at least one outlet; and an inner tank formed by sealed panel sections and end cap sections. The inner tank adapts to a shape of the outer tank and abuts against the outer tank. The inner tank comprises a plurality of circumferential ribs which are spaced along a length of the inner tank. The circumferential ribs abut against an inner surface, generally in intimate contact, either continuously or at discrete points, of the inner tank and conform to a shape of the inner tank. The ribs may have offset spacers which are equally spaced or randomly spaced at discrete areas around the circumference to aid in spanning over an area which has a large deformation. The inner tank further comprises at least one opening which corresponds to the at least one outlet of the outer tank.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6A is a view of the rolled panel section being expanded within the tank;

FIG. 6B is a sectional view showing a feature of the present invention in which an expander is utilized to expand the panel section;

FIG. 7 is a view of the panel section expanded within the tank;

DESCRIPTION OF THE PREFERRED EMBODIMENTS

Figure 1:
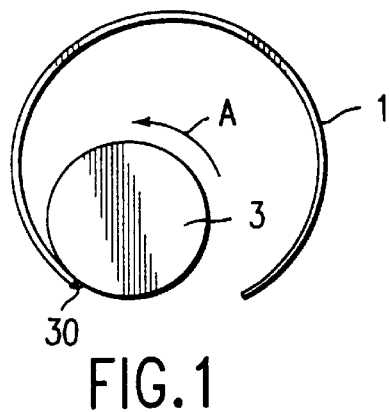
FIG. 1 is a view of a panel section of the present invention being rolled onto a shaft or mandrel.
Figure 2:
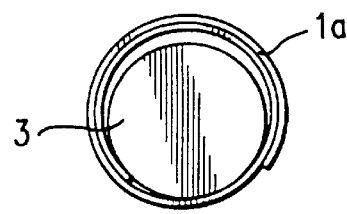
FIG. 2 illustrates the panel section rolled onto the shaft or mandrel.
Figure 3:
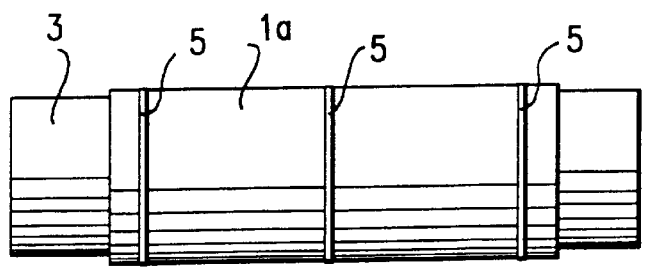
FIG. 3 is a side view illustrating the panel section rolled onto the shaft or mandrel with bands placed around the rolled panel sections.

Referring now to the drawings, wherein like reference numerals designate identical or corresponding parts throughout the several views, FIG. 1 illustrates a feature of the present invention in which a panel section 1 which can be either an impermeable or nearly impermeable flexible metallic material, steel, a fiberglass panel section, or flexible plastic is temporarily fixed or held at 30 on a mandrel or shaft 3. The panel section 1 is rolled, in the direction of the arrow A, to a desired diameter onto the mandrel or shaft 3 to form a rolled panel section 1a having a controlled amount of strain as illustrated in FIG. 2. The diameter of the mandrel or shaft 3 is based on the desired size of the rolled panel section 1a and is typically smaller than the desired roll diameter. For example, the mandrel or shaft 3 can have an outside diameter of 24 to 36 inches. However, it is noted that the outside diameter of the mandrel or shaft 3 is not limited to this diameter and is based on the size of the tank to be upgraded and the size of the panel section. Thereafter, as illustrated in FIG. 3, circumferential bands 5 are placed around the rolled panel section 1a and tightened, and the mandrel or shaft 3 is removed. The bands 5 can be, for example, 1 inch wide steel, cloth or nylon bands. At this point, the rolled panel section 1a with the bands 5 thereon will have a stored energy and can be taken to the site of an existing tank 7 (FIG. 4A) which is intended to be upgraded.

Figure 4A:
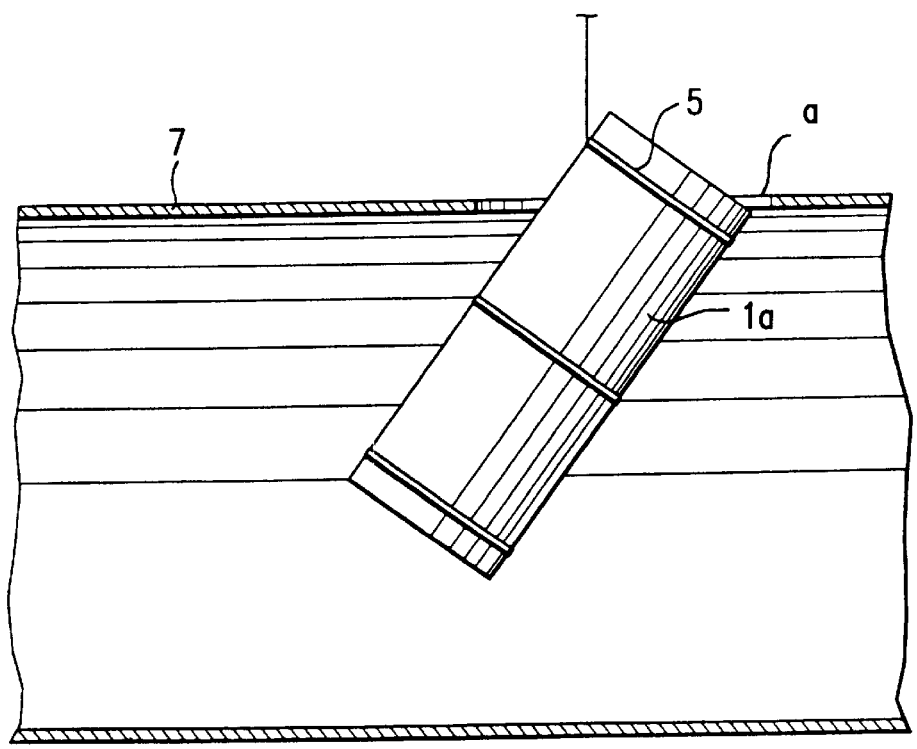
FIG. 4A is a view showing the rolled panel section being inserted into an existing tank.

If the existing tank 7 is underground, the soil can be excavated to the top of the tank 7 for the length of the existing tank 7. As illustrated in FIG. 4A, at least one and preferably two holes 9 can then be cut in the vicinity of each end of the tank 7. The one hole 9 is sized so as to permit a standard individual to enter through the hole 9. The other hole 9 is sized to permit easy placement of the rolled sections.

Figure 5:
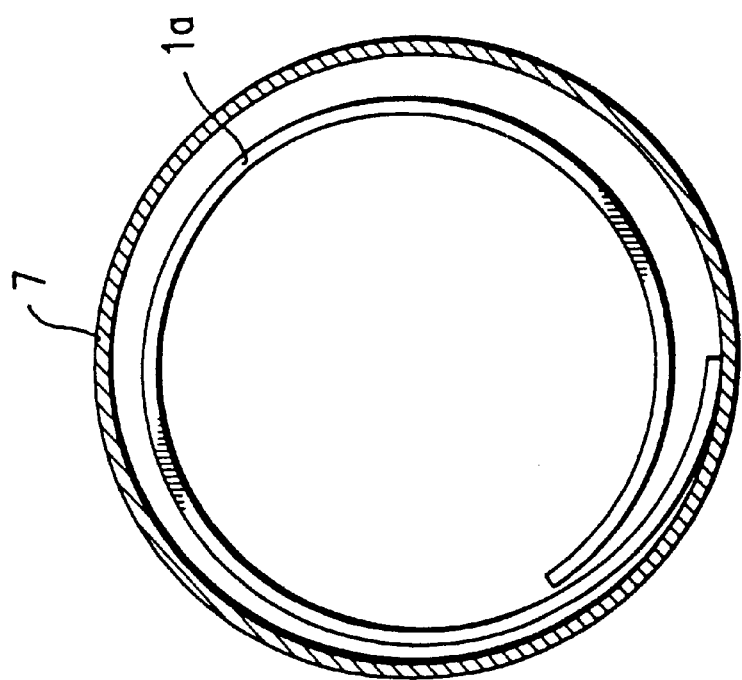
FIG. 5 shows the rolled panel section within the tank after the rolled panel section has been partially expanded after the band or bands is/are cut.
Figure 4B:
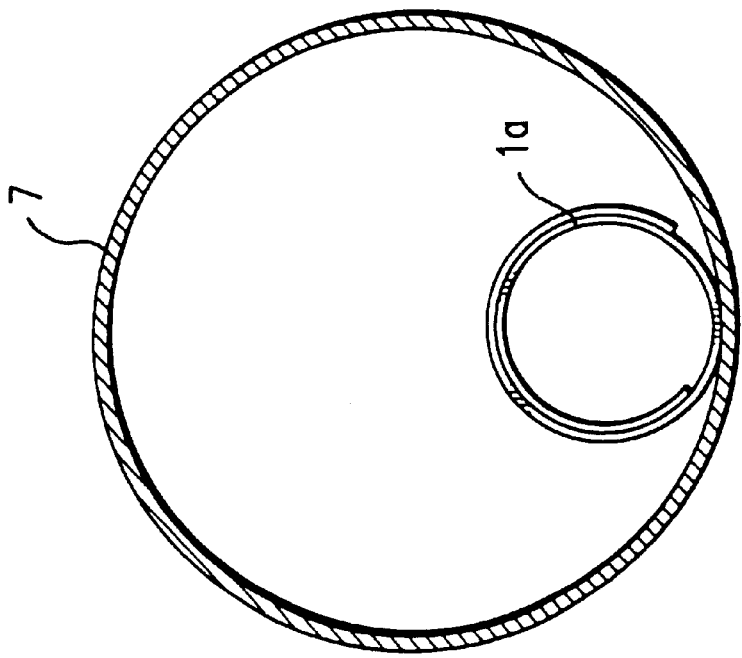
FIG. 4B illustrates the rolled panel section inside the existing tank.

As shown in FIG. 4A, once the holes 9 are cut in the tank 7, the rolled panel section 1a with the bands 5 therearound is inserted through the larger hole 9 and laid within the existing tank 7. The rolled panel section 1a with the bands 5 thereon is thereafter positioned at a desired location within the existing tank 7 (FIG. 4B), and the bands 5 are cut to release the stored energy so as to permit a controlled initial expansion of the rolled panel section 1a as illustrated in FIG. 5. In a preferred feature of the present invention, the rolled panel section 1a with the bands 5 thereon is positioned at an end of the existing tank 7 and subsequently inserted rolled panel sections are positioned adjacent to or spaced from a previously inserted rolled panel section.

After the bands 5 are cut to permit the controlled initial expansion of the rolled panel section 1a, the rolled panel section 1a can be further expanded through the utilization of radial jacks 11 as illustrated in FIG. 6A which may be hand expanded or power assisted. The radial jacks 11 can be a single array of two jacks fixed back-to-back or any arrangement and numbers within practical limits. The radial jack 11 can include radial arms 11a with rollers 11b at their ends which expand against the inner surface of the initially expanded rolled panel section 1a. The utilization of the radial jacks 11 permits the user to continuously expand the initially expanded rolled panel section 1a so as to completely conform to the inner circumference and shape of the existing tank 7. As one alternative to utilizing a hand crank jack 11, a nut and drive assembly with an air ratchet can be utilized. It is recognized that further means such as hydraulic means can also be utilized to fully expand the rolled panel section 1a.

It is further noted that the rolled panel section 1a can have at least one notch 50 on one edge as illustrated in FIG. 6B so as to permit the use of, for example, a turnbuckle expander 55 or toggle expander. This ensures that the rolled panel section 1a can be expanded to the maximum possible dimensions within the physical constraints of the existing tank 7.

After the rolled panel section 1a is fully expanded by use of, for example, the radial jacks 11 and the expander 55, a longitudinal seal 15a can be applied along the axial (or longitudinal) seam 15 of the rolled panel section 1a as shown in FIG. 7. The placement of the axial seam 15 is based on design considerations, and in an embodiment of the present invention, the axial seam can be placed at the vertical plane or some practical angle from the vertical plane so as not to interfere with drainage but still within easy access of the bottom.

Figure 8A:
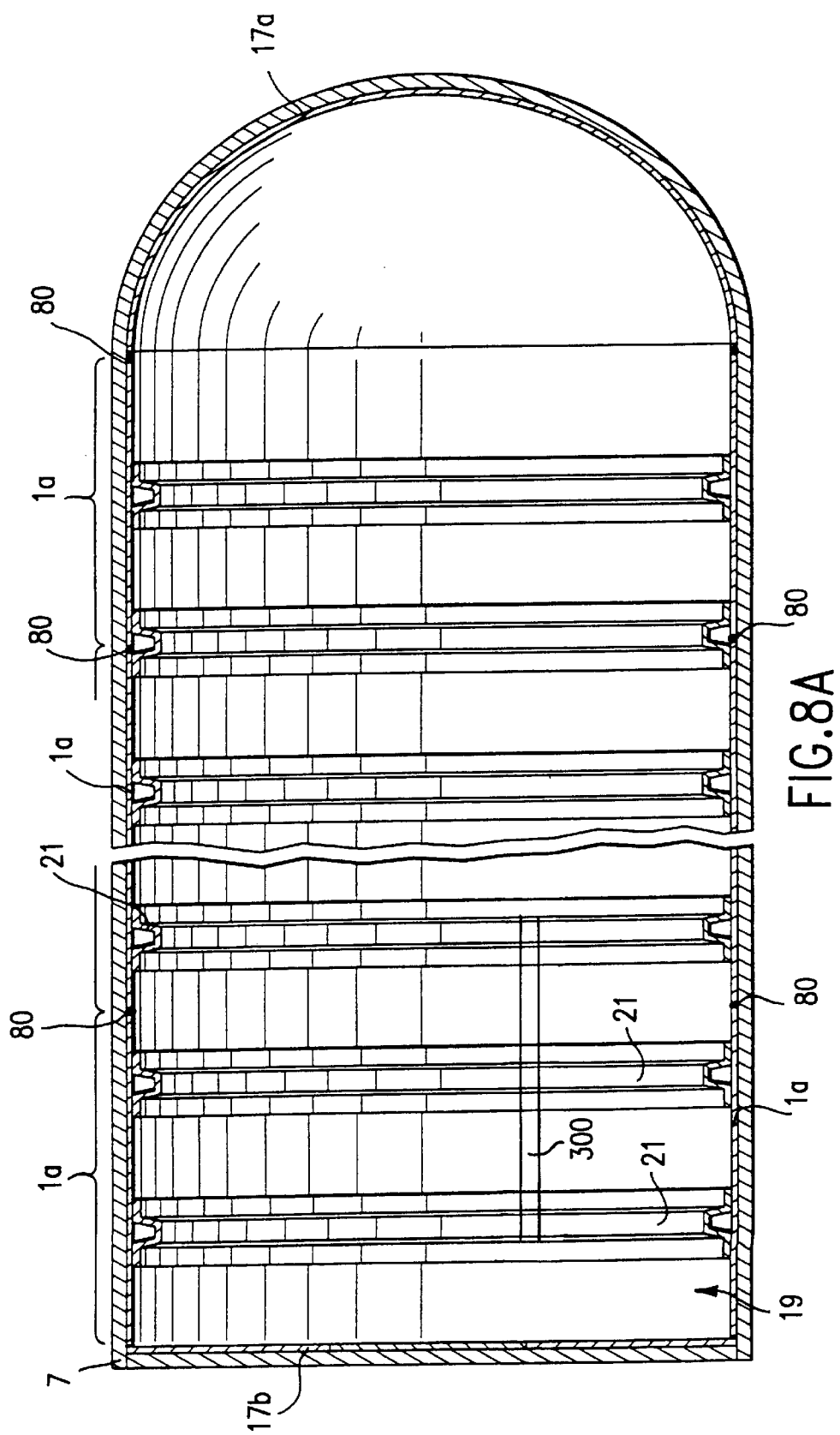
FIG. 8A illustrates a tank with a plurality of expanded panel sections and circumferential ribs therein.
Figure 8B:
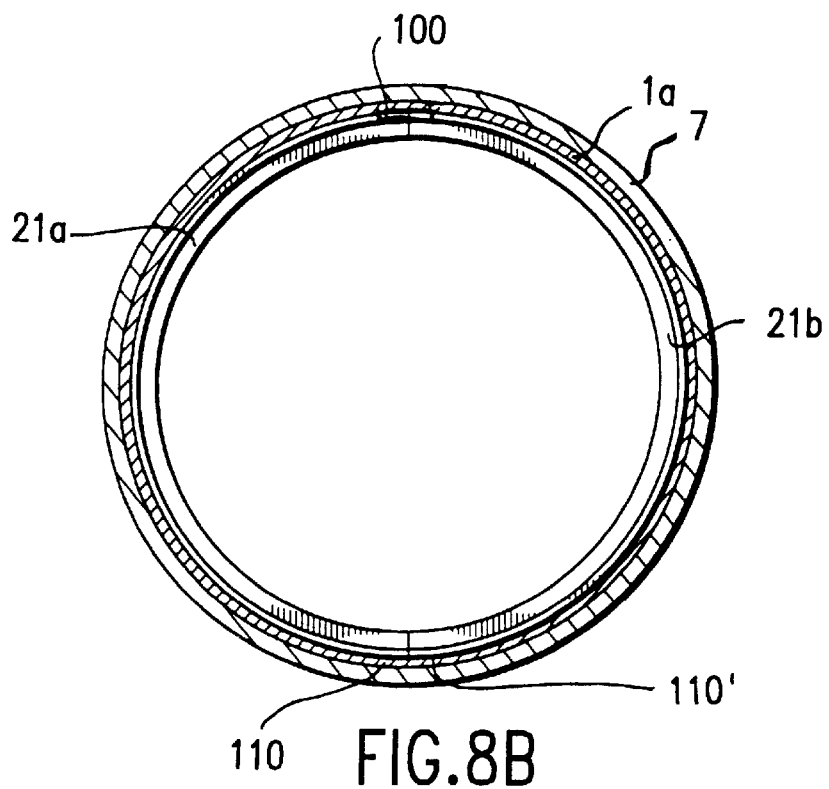
FIG. 8B is a view of the tank, panel section and circumferential rib.

Thereafter, further rolled panel sections 1a following the method discussed above are inserted through the hole 9 and placed adjacent to a previously inserted rolled panel section so as to cover the length of the existing tank 7 as shown in FIG. 8A. Typically, 8' tanks can utilize either two or three sections 1a. However, the size, width and length of the rolled panel sections to be inserted and expanded is based on design and practical installation considerations and the dimensions of the existing tank 7.

Figure 9:
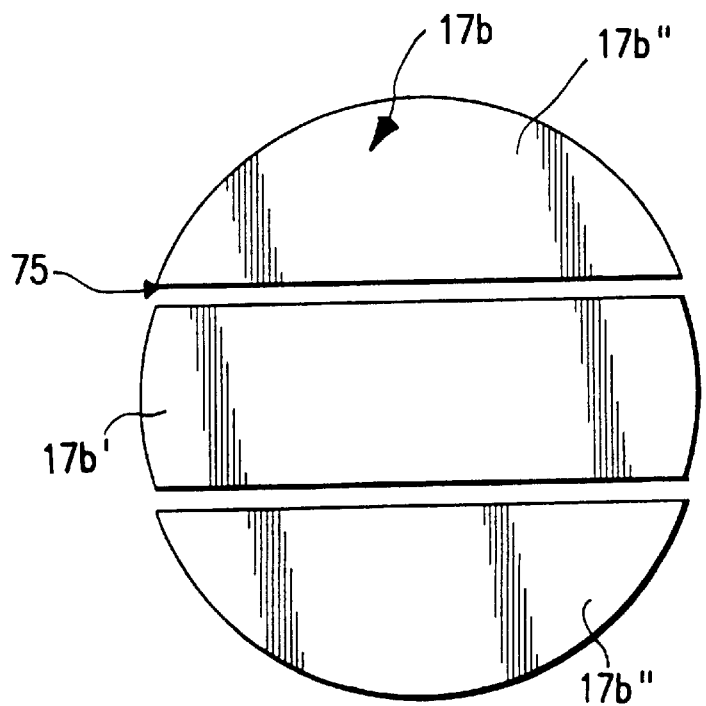
FIG. 9 is a view of the flat end section of the tank of FIG. 8A.
Figure 10:
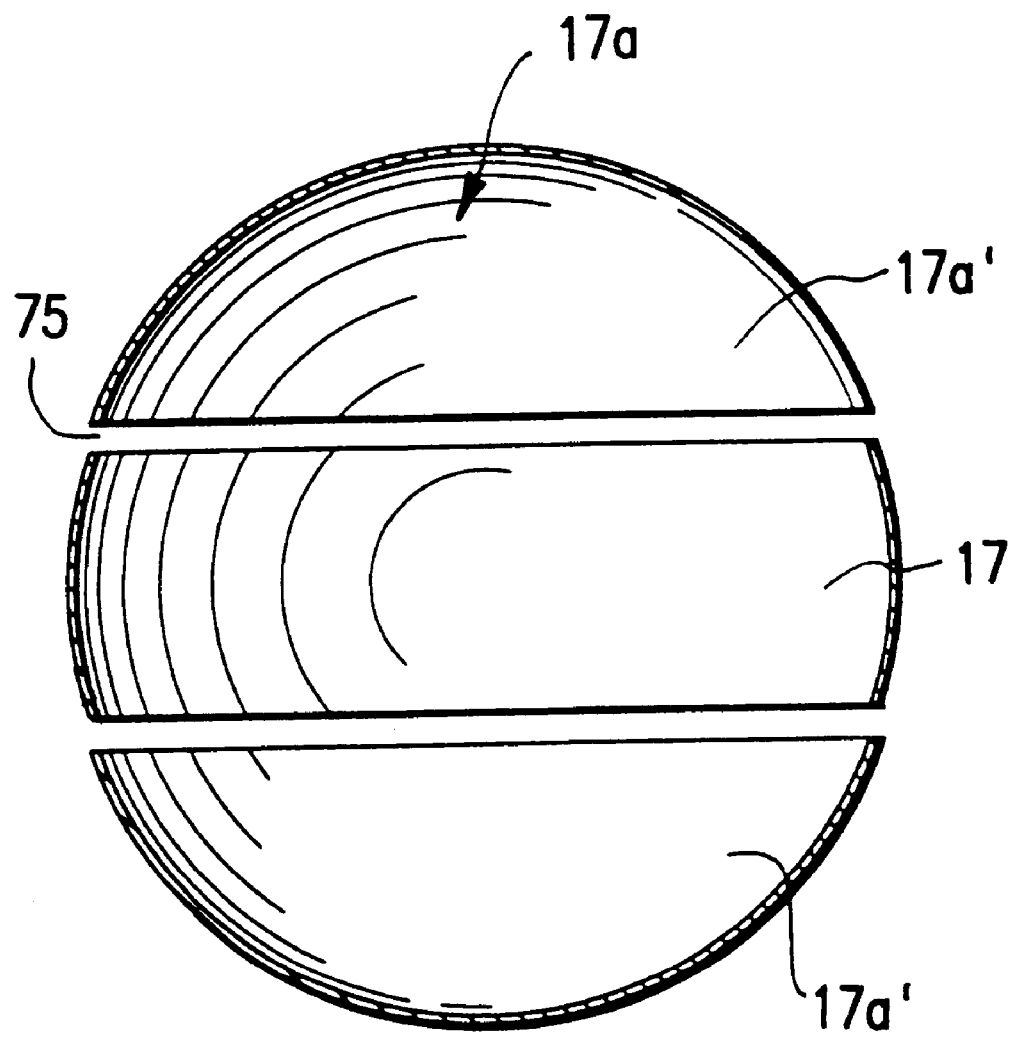
FIG. 10 is a view of the domed end section of the tank of FIG. 8A.

After the rolled panel sections 1a are installed, the user makes sure that all the transverse seams 80 between adjacent panel sections are flush. The user thereafter installs end caps which can be either domed 17a or flat 17b depending on the shape of the ends of the existing tank 7. The end caps 17a, 17b as illustrated in FIGS. 8A, 9 and 10 can be comprised of several sections or sectors. In the case of the dome cap 17a, the sectors 17a' can be crescent shaped (FIG. 10). In the case of the flat end 17b, the end cap can include an approximately rectangular sector 17b' and semicircular sectors 17b" (FIG. 9). Of course, it is recognized that the end caps may be installed first and then the panel sections can be installed. The end caps can be either steel, metallic, fiberglass or plastic or any other appropriate material that can be used for containing a fluid.

After inserting the sections for the end caps 17a, 17b through the hole 9, and after the end caps 17a, 17b are assembled against the inner surface of the end of the existing tank 7, the user seals all the seams 75 between the adjacent sections which make up the end caps 17a, 17b. The user also seals the transverse seams 80 (FIG. 8A) between the adjacent panel sections; and between the end caps and the panel sections adjacent to the end caps, so as to provide for an assembled leak tight tank 19 within the existing tank 7.

The method of the present invention further provides for the installation of spaced circumferential ribs 21 along the length of the assembled inner tank 19 so as to strengthen the rigidity of the inner tank 19 as illustrated in FIG. 8A. The circumferential ribs 21 can be installed by first installing rib guides 100 at the top of the tank with, for example, hot melt glue or other appropriate adhesive, then screwing upper parts of half sections 21a, 21b of the rib 21 to the rib guides adhered to the rolled panel section 1a by utilizing, for example, screws. Expanders can then be utilized at the lower portion between the rib half sections 21a, 21b to expand the rib 21 as far as possible. The lower parts of the rib half sections 21a, 21b can be attached to the inner circumference of lower portions 110, 110' of the inner tank 19 (rolled panel section 1a) by way of screws, sealant adhesive or fiberglass lay-ups. The rib sections are attached to the inner tank at approximately 90° spacings using fiberglass lay-ups specified by engineering design. Also, offset spacers 300 can be utilized to maintain a proper spacing between the ribs. The offset spacers 300 can be utilized during the installation of the ribs to maintain the proper and/or desired spacing between the ribs and can span between 2 or 3 consecutive ribs.

Also, drain slots can be provided at the bottom of the ribs to permit complete drainage. Drain slots are typically 4" high and designed to optimize flow and structural performance.

All existing tank fitting holes are permanently sealed and/or replaced. After the panel sections are installed but prior to installing the ribs, manway(s) are installed by connecting to the inner shell. For upgrading FRP tanks, the manway is connected to both the inner and outer tank, completing a sealed interstice for a double walled tank.

Existing steel tanks may be upgraded to double wall tanks by replicating the installation of end caps and rolled shell sections before installing the ribs. The manways are then installed as above.

Before installing all rolled panel sections on a fiberglass tank, a hole or fitting may be drilled at the top in the existing tank for annular space leak detection and monitoring fluid. For a steel tank upgrade to a double walled tank, a hole may be drilled in the first installed rolled panel section before the second set is installed for the same purpose.

Therefore, with the method of the present invention, an existing tank 7 can be upgraded by the insertion of panel sections 1a within the existing tank 7 in about three to four working days or less. Additionally, the cost involved with the method of the present invention would be approximately 50% less than replacing the existing tank with a new tank. With the method of the present invention, it is possible to go to a site and upgrade the existing tank system 7 with the least amount of disruption such as limiting access to the site.

As an added feature of the present invention, the method provides for the assembly of a second tank 19 within the existing tank 7 in which the assembled second tank 19 can be rated as a UL approved stand-alone tank. Therefore, any structural or material deficiency of the existing tank 7 will be partially or fully compensated for by the assembled inner tank 19. Additionally, since the existing tank 7 will more than likely have at least one inlet or outlet opening (manway), after the panel sections 1a are inserted and assembled in the inner tank 7, holes which correspond to any inlets or outlets (manways) of the existing tank 7 can be made in the assembled inner tank 19. The expansion of the rolled panel sections 1a against the outer or existing tank 7 is in intimate contact with the existing tank and thus can be considered as encased for buckling resistance.

In the assembly method of the present invention, after establishing that the tank 7 to be upgraded is safe to enter, the tank 7 is cleaned. Then the tank 7 is inspected and the ground is excavated (if the existing tank is underground) to the top of the tank 7 for the length of the tank 7. At least one hole 9 and preferably two holes are cut in the tank 7. Each hole 9 needs to be large enough to permit a man to enter the egress, and one hole needs to be large enough to insert the rolled sections.

Banded rolled panel sections 1a as discussed above are then inserted through the hole 9 and the banded rolled panel sections 1a are slid along the tank 7 to a desired position. The bands 5 are then cut and controlled initial expansion of the rolled panel sections 1a is achieved by leaving the lifting loop in place around the coiled panel section. Thereafter, a radial jack 11 either hand powered or power assisted is inserted within the initially expanded rolled panel section 1a to expand the panel section so as to conform to an inner circumference of the tank 7 ensuring the tightest practical fit. In a desired feature of the present invention, the rolled panel sections 1a can have a notch 50 on at least one edge so as to facilitate the use of a shell expander to provide for further expansion of the rolled panel section 1a against the inner surface of the tank 7. Additional panel sections are inserted ensuring the tightest practical fit through hole 9 and placed adjacent to the first panel section until the entire inner circumference of the tank 7 is covered by the rolled panel sections 1a.

Thereafter, sections to form a dome or flat end are inserted through the hole 9 and positioned at either or both ends of the adjacent rolled panel sections to form the ends of the inner tank 19. Alternatively, one or both ends may be installed prior to installing the panel sections.

All of the seams including the transverse and axial seams are sealed, and circumferential ribs are installed and connected to the panels along the length of the inner tank 19. In an embodiment of the invention, the ribs can be comprised of half rib sections (C sections) which are each screwed to rib guides at the top (bottom optional) which are glued to the top and/or bottom of the inner surface of the inner tank. The ribs can thereafter be expanded so as to conform to the inner surface of the inner tank and the rib can be attached or sealed to at least one other position on the inner tank. Manways are installed at each hole and the covers provide a surface for replacement fittings for fill vent, etc. Additional options include installing fittings along the axial length.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method of assembling a second tank within an existing first tank by at least one person, the method comprising the steps of:

rolling a panel section on a shaft so as to provide for a rolled panel section;

applying at least one band circumferentially around the rolled panel section so as to provide for a banded rolled panel section;

removing the shaft from the banded rolled panel section;

placing the banded rolled panel section within an existing first tank;

entering the tank;

cutting the at least one band around the banded rolled panel section so as to permit an initial expansion of the rolled panel section;

further expanding the initially expanded rolled panel section to provide for an expanded rolled panel section which conforms to an inner circumference of the existing first tank, and;

circumferentially installing ribs in a spaced manner along a length of the expanded rolled panel section;

wherein the entering step is performed by the at least one person entering the tank through an appropriately sized opening in the tank.

2. An assembly method according to claim 1, comprising the further step of:
   sealing an axial seam of the expanded rolled panel section.

3. An assembly according to claim 1, wherein said step of circumferentially installing the ribs comprises the steps of:
   attaching at least one portion of each of the ribs to a first location at an inner surface of the expanded rolled panel section;
   expanding each of the ribs so as to conform to an inner circumference of the expanded rolled panel section; and
   attaching a further portion of the ribs to at least one second location on the inner surface of the expanded rolled panel section.

4. A method according to claim 1, wherein a plurality of said expanded rolled panel sections are adjacently provided along a length of the existing first tank.

5. An assembly method according to claim 4, comprising the further step of:
   installing and assembling end cap sections at ends of the expanded rolled panel sections so as to correspond to ends of the existing first tank.

6. An assembly method according to claim 5, wherein said step of assembling said end cap sections comprises assembling a plurality of curved crescent shaped sectors to form a dome.

7. An assembly method according to claim 5, wherein said step of assembling said end cap sections comprises assembling a generally rectangular section and circular sectors to form a flat end section.

8. An assembly method according to claim 5, comprising the further step of:
   cutting at least one hole in said existing first tank;
   wherein said step of installing said end cap sections comprises the step of inserting said end cap sections through said at least one hole.

9. An assembly method according to claim 5, wherein said end cap sections are steel or metallic.

10. An assembly method according to claim 5, wherein said end cap sections are fiberglass or plastic.

11. A method according to claim 1, wherein a plurality of said expanded rolled panel sections are provided at spaced intervals along a length of the existing first tank.

12. An assembly method according to claim 11, comprising the further step of:
    installing and assembling end cap sections at ends of the expanded rolled panel sections so as to correspond to ends of the existing first tank.

13. An assembly method according to claim 12, wherein said step of assembling said end cap sections comprises assembling a plurality of curved crescent shaped sectors to form a dome.

14. An assembly method according to claim 12, wherein said step of assembling said end cap sections comprises assembling a generally rectangular section and circular sectors to form a flat end section.

15. An assembly method according to claim 12, comprising the further step of:
    cutting at least one hole in said existing first tank;
    wherein said step of installing said end cap sections comprises the step of inserting said end cap sections through said at least one hole.

16. An assembly method according to claim 12, wherein said end cap sections are steel or metallic.

17. An assembly method according to claim 12, wherein said end cap sections are fiberglass or plastic.

18. An assembly method according to claim 11, comprising the further steps of:
    sealing an axial seam along a length of the inserted expanded rolled panel sections;
    sealing transverse seams between the inserted expanded rolled panel sections; and
    sealing said end cap sections on said expanded rolled panel sections so as to form said second tank.

19. An assembly method according to claim 1, comprising the further step of:
    cutting at least one hole in said existing first tank;
    wherein said step of placing the banded rolled panel section in the existing first tank comprises the step of inserting the banded roll panel section through said at least one hole.

20. An assembly method according to claim 1, wherein said panel section is steel or metallic.

21. An assembly method according to claim 1, wherein said panel section is fiberglass or plastic.

22. An assembly method according to claim 1, wherein said at least one band is a steel or metallic band.

23. An assembly method according to claim 1, wherein said at least one band is a cloth band.

24. An assembly method according to claim 1, wherein said at least one band is a nylon band.

25. An assembly method, according to claim 1, wherein said step of further expanding the initially expanded rolled panel section comprises using an expanding means having radial arms which abut against an inner surface of said partially expanded rolled panel section.

26. An assembly according to claim 1, wherein the entering step is performed by entering the tank through an existing manway.

27. A method of assembling a second tank in a first tank by a person comprising the steps of:
    cutting at least one hole in the first tank;
    rolling a first panel section;
    inserting the rolled first panel section in said first tank through said hole;
    entering the first tank through an opening sized to allow entry by the person;
    unrolling said rolled first panel section in said first tank;
    expanding said unrolled first panel section so as to conform to an inner circumference of said first tank;
    repeating the rolling, inserting, unrolling and expanding steps for at least a second panel section while placing the at least second panel section adjacent to or spaced from the first panel section;
    sealing an axial seam along a length of said first and second panel sections;
    sealing a transverse seam between the first and second panel sections so as to form said second tank that is liquid tight; and
    placing and attaching circumferential ribs along a length of the second tank formed by said panel sections.

* * * * *